United States Patent [19]

Takeuchi et al.

[11] Patent Number: 4,528,491
[45] Date of Patent: Jul. 9, 1985

[54] PULSE MOTOR CONTROL APPARATUS

[75] Inventors: Kunihiko Takeuchi, Kawasaki; Kiyoshi Hayashi; Yasuo Shimomura, both of Tokyo, all of Japan

[73] Assignee: Tokyo Keiki Company, Ltd., Tokyo, Japan

[21] Appl. No.: 564,082

[22] Filed: Dec. 20, 1983

[30] Foreign Application Priority Data

Dec. 28, 1982 [JP] Japan ................. 57-230182

[51] Int. Cl.³ .......................................... G06F 15/46
[52] U.S. Cl. ................... 318/603; 318/567; 318/568
[58] Field of Search ............ 318/685, 696, 603, 567, 318/568, 341

[56] References Cited

U.S. PATENT DOCUMENTS 4,066,941 1/1978 Foster ............................. 318/341

Primary Examiner—B. Dobeck
Assistant Examiner—Saul M. Bergmann
Attorney, Agent, or Firm—Wenderoth, Lind & Ponack

[57] ABSTRACT

Displacement table data, which consist of pulse number data for N individual displacement divisions which altogether constitute a given rotational displacement of a pulse motor, are stored in a memory so that the sum of pulse numbers stored in the individual divisions may be equal to a given pulse number corresponding to the displacement of the pulse motor. Pulse period table data, which consist of pulse period data for determining the speed of the pulse motor for divisions corresponding in number to the number of divisions of the displacement table data, are stored in another memory. The pulse motor control is effected by causing generation of pulses corresponding in number to the pulse number data for the individual displacement divisions of the displacement table and having pulse periods for the individual divisions of pulse period table, and by executing the generation of pulses for the successive divisions.

5 Claims, 10 Drawing Figures

| | | |
|---|---|---|
| 0 | 500 | |
| 1 | 450 | |
| 2 | 400 | |
| 3 | 350 | |
| 4 | 300 | |
| 5 | 200 | |
| 6 | 100 | |
| 7 | 80 | TS-1 |
| 8 | 100 | |
| 9 | 200 | |
| 10 | 300 | |
| 11 | 350 | |
| 12 | 400 | |
| 13 | 450 | |
| 14 | 500 | |
| 15 | 1000 | |
| 0 | 1000 | |
| 1 | 1000 | |
| 2 | 2000 | TS-2 |
| 3 | 2000 | |
| 4 | 2000 | |

| | | |
|---|---|---|
| 14 | 1000 | |
| 15 | 4000 | |
| 0 | $T_0$ | |
| 1 | $T_1$ | |
| 2 | $T_2$ | |
| 3 | $T_3$ | |
| 4 | $T_4$ | |
| 5 | $T_5$ | |
| 6 | $T_6$ | |
| 7 | $T_7$ | TS-K |
| 8 | $T_8$ | |
| 9 | $T_9$ | |
| 10 | $T_{10}$ | |
| 11 | $T_{11}$ | |
| 12 | $T_{12}$ | |
| 13 | $T_{13}$ | |
| 14 | $T_{14}$ | |
| 15 | $T_{15}$ | |
| 0 | 5000 | |
| 1 | 500 | |
| | 100 | |

| | | |
|---|---|---|
| 13 | 1000 | |
| 14 | 1000 | |
| 15 | 300 | |
| 0 | 150 | |
| 1 | 120 | |
| 2 | 110 | |
| 3 | 100 | |
| 4 | 80 | |
| 5 | 3000 | TS-31 |
| 6 | 2000 | |
| 7 | 1500 | |
| 8 | 250 | |
| 9 | 150 | |
| 10 | 100 | |
| 11 | 80 | |
| 12 | 90 | |
| 13 | 100 | |
| 14 | 100 | |
| 15 | 300 | |

20ms/scale (T)

20ms/scale (T)

10ms/scale (T)

PULSE MOTOR CONTROL APPARATUS

BACKGROUND OF THE INVENTION

1. Field of the Invention

The present invention relates to a pulse motor control apparatus, which permits desired setting and control of the rotational displacement and a speed pattern of a pulse motor until the prescribed displacement is covered.

2. Description of the Prior Art

As for pulse motor control systems known to date, there are included constant speed control systems (fixed frequency systems) and constant acceleration control systems (variable frequency systems).

FIG. 1 is a graph showing displacement curves obtained by a constant speed control system. This system uses an oscillator, a frequency divider, a counter and so forth, and the number of pulses required until a prescribed displacement M is covered is set by means of a digital switch, etc. A pulse motor is rotated at a constant speed for the prescribed displacement M by receiving the preset number of pulses which are supplied with a constant pulse period (a fixed frequency). In controlling the pulse motor from a relative position, the displacement therefrom to a specified position is calculated to obtain the number of pulses, and the pulse motor is driven at a constant speed to the specified position in the same manner as described above.

FIG. 2 is a graph showing displacement curves obtained by a constant acceleration control system. This system uses a variable frequency oscillator which can variably control the pulse period. With this system, the pulse motor is driven at a constant acceleration by generating, for instance, 50 pulses necessary for a prescribed displacement M, at a rate varied from 100 to 1000 pulses per second.

In the actual pulse motor control, however, displacement patterns other than the constant speed and constant acceleration displacement patterns, such as analogous displacement patterns based on a variation in the prescribed displacement and displacement patterns suited to the characteristics of the load of the pulse motor, for example, are required. Such displacement patterns cannot be freely produced with the prior art constant speed and constant acceleration control systems.

SUMMARY OF THE INVENTION

One object of the present invention is to provide a pulse motor control system which permits a desired pulse motor displacement pattern to be obtained within the maximum number of pulse motor steps.

Another object of the present invention is to provide a pulse motor control apparatus which utilizes, as data for obtaining displacement patterns, displacement table data consisting of pulse number data for displacement divisions which altogether constitute a given displacement of the pulse motor and pulse period table data consisting of pulse pulse period data for determining the speed of the pulse motor for each of the displacement divisions noted above, these table data being provided as different data blocks.

Still another object of the present invention is to provide a pulse motor control apparatus which permits selection of a desired displacement and a desired displacement speed by specifying corresponding table data block numbers.

A further object of the present invention is to provide a pulse motor control apparatus which can be utilized for the control of any apparatus driven by a pulse motor.

The aforementioned and other objects, features and advantage of the present invention will become more apparent from the following description taken in connection with the accompanying drawings.

BRIEF DESCRIPTION OF THE DRAWINGS

FIG. 5 is an explanatory view showing one example of the displacement tables usable for the purpose of the present invention.

FIG. 6 is an explanatory view showing one example of the time length tables usable for the purpose of the present invention.

DESCRIPTION OF THE PREFERRED EMBODIMENT

Figure 1:
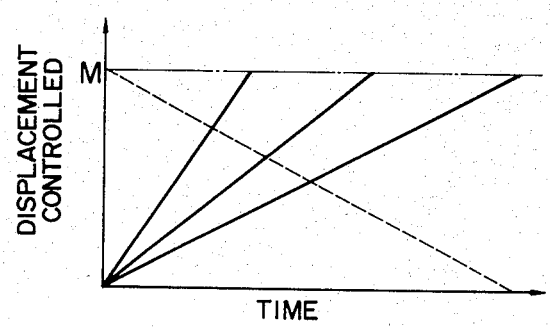
FIG. 1 is a graph showing pulse motor control characteristics obtained according to a conventional constant speed control system.
Figure 2:
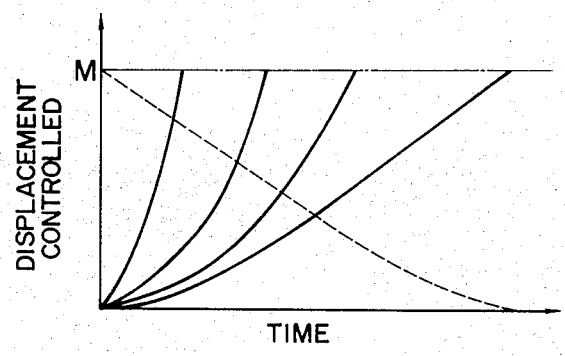
FIG. 2 is a graph showing pulse motor control characteristics obtained according to a conventional constant acceleration control system.
Figure 3:
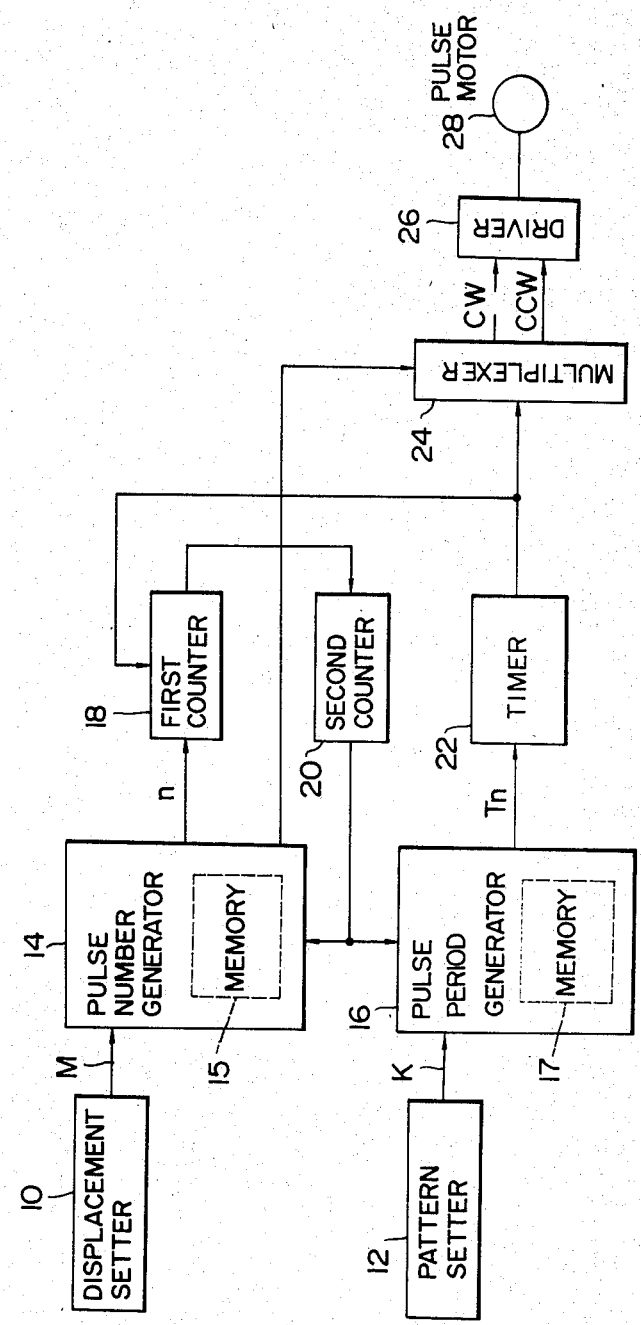
FIG. 3 is a block diagram showing one embodiment of the pulse motor control apparatus according to the present invention.

FIG. 3 is a block diagram showing one embodiment of the pulse motor control apparatus according to the present invention. The apparatus comprises a displacement setter 10 for setting the displacement M of a pulse motor and a pattern setter 12 for setting the displacement speed pattern K to allow the pulse motor to be rotated by the displacement M set by the displacement setter 10. The output of the displacement setter 10 is supplied to a pulse number generator 14. The pulse number generator 14 includes a memory 15 in which are stored displacement table data consisting of pulse number data $n_0$ to $n_{15}$ for N (N=16 in this embodiment) individual displacement divisions which altogether constitute the given displacement M as will be described later in more detail.

The output of the pattern setter 12 is supplied to a pulse period generator 16 which generates pulse period data for determining the speed of the pulse motor according to a given displacement speed pattern K. To generate the pulse period data, the pulse period generator 16 includes a memory 17, in which are stored pulse period table data consisting of pulse period data $T_0$ to $T_{15}$ for determining the speed of the pulse motor for individual displacement divisions corresponding to those of the displacement table data.

The output of the pulse number generator 14 is fed to a first counter 18 which is an up-down counter. A pulse number n read out of the displacement table in the memory 15 in the pulse number generator 14 is preset in the first counter 18. The first counter 18 counts pulses issued from a timer 22 as will be described afterwards in more detail. When its count reaches the preset number n, the first counter 18 supplies an output to a second counter 20 in the subsequent stage. The second counter 20 counts output signals from the first counter 18 and, every time it counts one, it causes the pulse number data and pulse period data for the next division to be generated from the respective memories until the count becomes N=16 and preset in the first counter 18. When the count becomes N=16, it resets the pulse number generator 14 and pulse period generator 16.

The output of the pulse period generator 16 is fed to the timer 22. The timer 22 issues pulses as pulse motor drive pulses of pulse period Tn corresponding to pulse period data output from the pulse period generator. The output of the timer 22 is also fed to a multiplexer 24. The multiplexer 24 also receives a signal for determining the direction of rotation of the pulse motor from the pulse number generator 14. According to this rotational direction command signal, it produces a CW pulse for rotating the pulse motor in the clockwise direction or a CCW pulse for rotating the pulse motor in the counter-clockwise direction. A driver 26 drives the pulse motor 28 according to the pulse output from the multiplexer 24.

Now, the displacement table data stored in the memory 15 of the pulse number generator 14 and the pulse period data stored in the memory 17 of the pulse period generator 16 will be described in detail.

Figure 4:
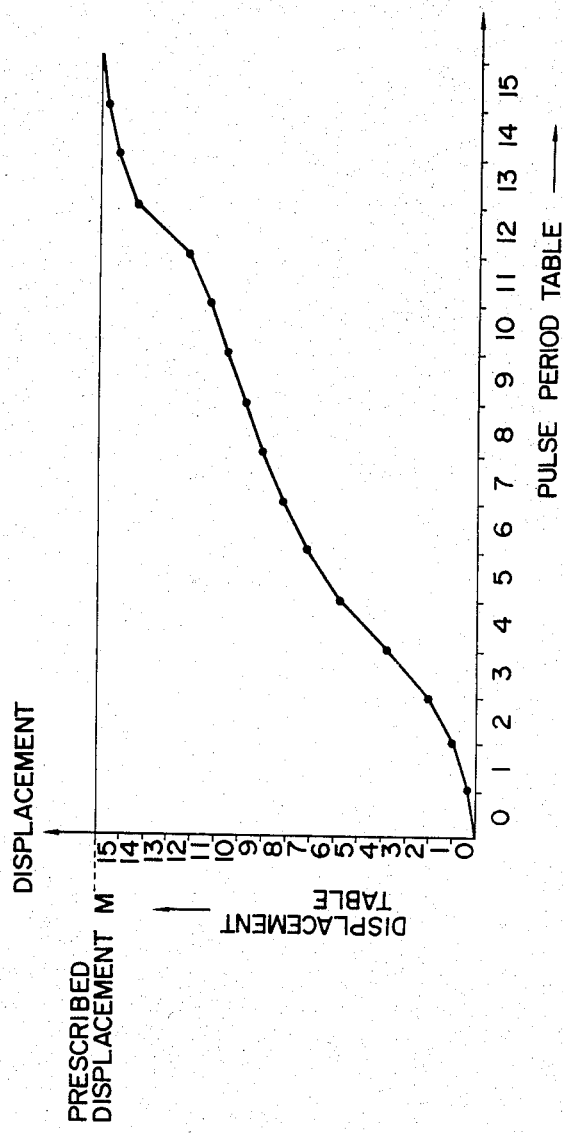
FIG. 4 is an explanatory graph showing the principle underlying the formation of table data according to the present invention.

FIG. 4 is a graph showing a pulse motor control plot according to the present invention. The axis of abscissa of this graph is graduated for the pulse period table and the axis of ordinate thereof for the rotational displacement table respectively. The prescribed displacement M of the displacement table as the ordinate is divided into 16 divisions. The time of the pulse period table as the abscissa is also divided into 16 divisions. With the division of the displacement M and that of the time length respectively into 16 divisions, a given control pattern can be approximated by segments connecting its intersections with lines normal to the pulse period axis and passing points dividing the time required into 16 divisions. Since the rotational displacement of the pulse motor per pulse, i.e. the step of the pulse motor, is fixed, the slope of each segment may be determined by appropriately setting the pulse number and pulse period. The number n of steps for the unit displacement, i.e. each of the 16 divisions of the prescribed displacement M, is set as displacement data for each displacement division. The pulse period Tn for the unit of time, i.e. each of the 16 divisions of the time necessary for the displacement M of the pulse motor, is set as time data for each displacement division.

More specifically, the displacement table data represent the step numbers $n_0$ to $n_{15}$ for the individual 16 divisions, which altogether constitute the prescribed displacement M, this data being stored in respective 16 addresses $A_0$ to $A_{15}$ of the memory 15. When the prescribed displacement M equals 32, for example, the following equation is satisfied:

$$M/16 = 32/16 = 2$$

In this case, data $n_0$ to $n_{15} = 2$ are set in the individual 16 addresses $A_0$ to $A_{15}$. However, when the prescribed displacement M equals 50, the following equation is obtained:

$$M/16 = 50/16 = 3 \text{ with the remainder of 2}$$

That is to say, when the individual data is uniformly set to n=3 in this case, the remainder of 2 is left and, as a result, the prescribed displacement M=50 cannot be covered. Accordingly, when any remainder is left relative to the 16 divisions, such as when M=50, the number 50 is identified with $3 \times 14 + 4 \times 2$, thereby setting data of n=3 for 14 addresses and data of n=4 for the rest of the addresses. In general, the data $n_0$ to $n_{15}$ are set such that the following equation is satisfied: $M = n_0 + n_1 + \ldots + n_{15}$ On the other hand, the time data represent the pulse periods Tn (n=0 to 15) for the individual 16 divisions of the required time, this data being stored in respective addresses $A_0$ to $A_{15}$ of the memory 17. The values Tn may suitably be set in conformity with the desired pulse motor control pattern.

Figure 5:
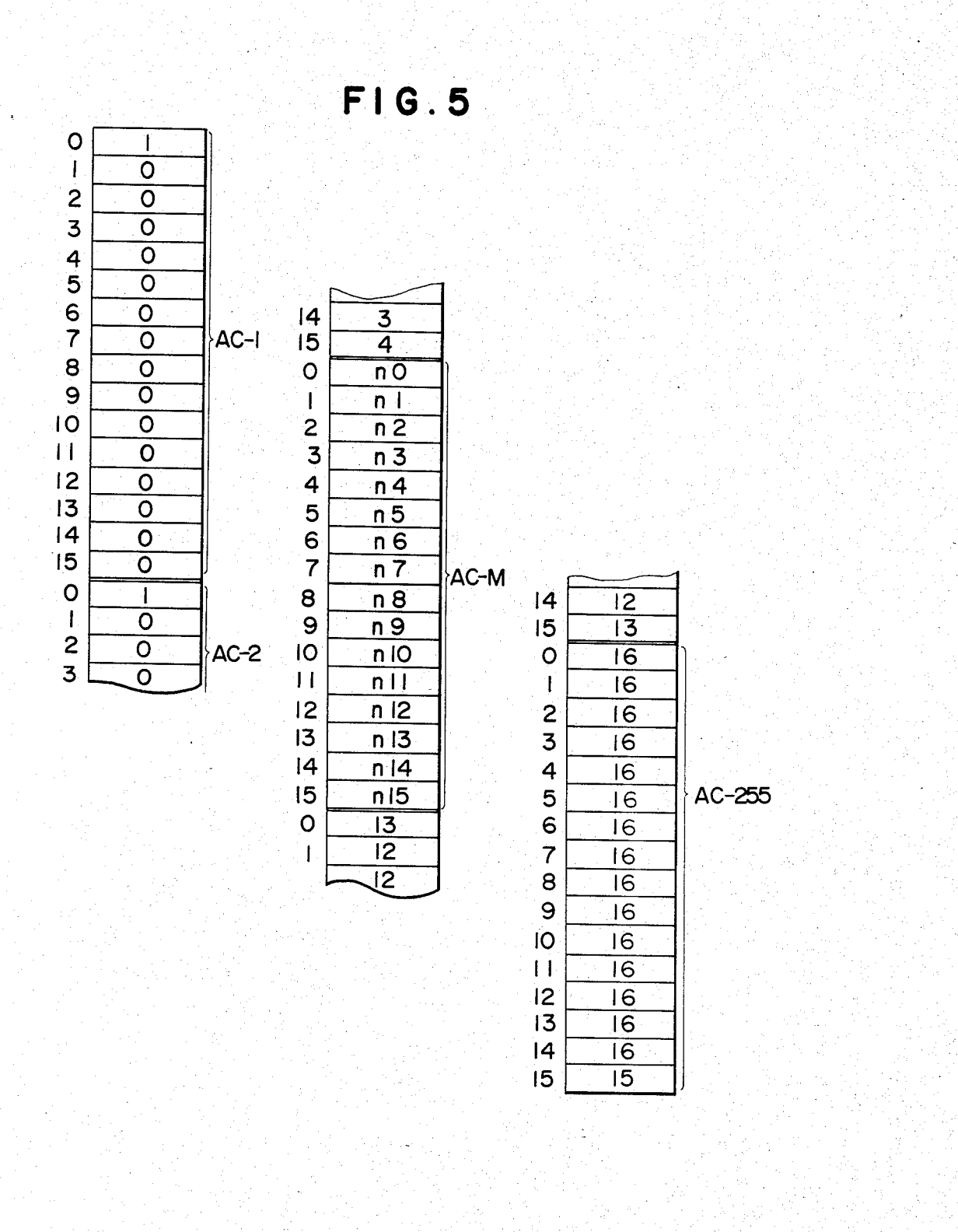

FIG. 5 illustrates an example of the displacement table data used in accordance with the present invention. In this example, the maximum rotational displacement of the pulse motor corresponds to 256 steps. Therefore, 255 blocks AC-1 to AC-255 corresponding respectively to prescribed displacement M of M=1 to M=255 are stored as the displacement table data. When a desired value is set as the displacement M in the displacement setter 10 shown in FIG. 3, the corresponding block is selected.

FIG. 6 illustrates an example of the pulse period table data used in accordance with the present invention. In this example, 31 different displacement patterns are stored respectively as blocks TS-1 to TS-31. Each of the blocks has 16 addresses $A_0$ to $A_{15}$, in which respective pulse periods $T_0$ to $T_{15}$ are stored as typically shown in the block TS-K in units of 10 $\mu$sec. as shown for the other blocks.

According to the present invention, the pulse motor is controlled according to the displacement and pulse period table data M and K shown in FIGS. 5 and 6. For example, in case where the block AC-M in FIG. 5 and the block TS-K in FIG. 6 are selected, $n_0$ pulses of the pulse period of $T_0$ are generated for the first displacement division, $n_1$ pulses of the pulse period of $T_1$ are generated for the next displacement division, and so forth until $n_{15}$ pulses of the pulse period $T_{15}$ are generated for the last displacement division.

Figure 7:
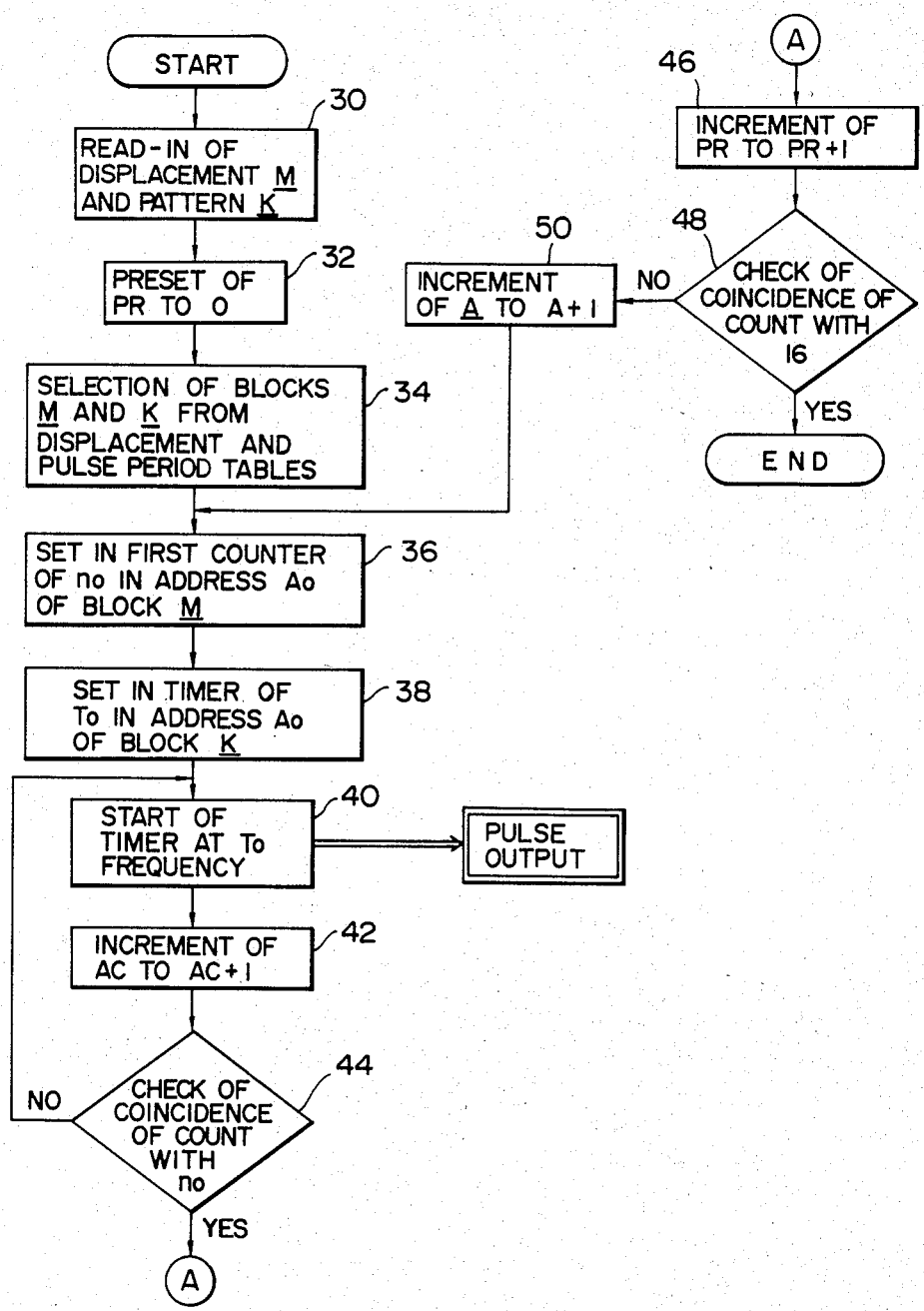
FIG. 7 is a flowchart illustrating the control operation of the embodiment in FIG. 3.

The operation of the embodiment shown in FIG. 3 will now be described with reference to the flowchart of FIG. 7.

Preliminarily, a desired displacement M is set by the displacement setter 10, and also the number of a desired displacement pattern is selected from among the displacement patterns stored in the pulse period table of the memory 17 and set by the pattern setter 12. After the desired displacement M and displacement pattern K have been set, they are read in a step 30. Then, a step 32 is executed, in which the count PR of the second counter 20 is preset to 0. In a subsequent step 34, the read-out blocks M and K are selected from the displacement and pulse period tables stored in the memories 15 and 17, respectively. In a subsequent step 36, the number $n_0$ of pulses stored in the first address $A_0$ of the selected block M is set in the first counter 18. In a subsequent step 38, the pulse period $T_0$ stored in the first address $A_0$ of the selected block K is set in the timer 22. With the pulse period $T_0$ set therein, the timer 22 issues a pulse of the constant pulse period $T_0$ in a step 40. The pulse thus issued is fed through the multiplexer 24 to the driver 26 to cause rotation of the pulse motor 28 by one step in a preset direction. It is also fed to the first counter 18 to cause an increment of the count AC thereof to AC+1 in a step 42. Then, a step 44 is executed, in which a check is effected as to whether the count of the first counter 18 coincides with the pulse number $n_0$ set in the step 36. When the count does not coincide, the routine is returned to the step 40 so that the next pulse of the pulse period $T_0$ is issued. Through the steps 40, 42 and 44, the timer 22 issues pulses successively until the pulse number coincides with the pulse number $n_0$ set in the step 36.

When the count of the first counter 18 coincides with the pulse number $n_0$, a step 46 is executed, in which the first counter 18 produces a count output to cause increment of the count PR of the second counter 20 to PR+1. Then, a step 48 is executed, in which a check is effected as to whether the count of the second counter 20 coincides with the number N (N=16) of the displacement divisions. When the former is less than the latter, it means that the control has not yet been completed. In this case, therefore, a step 50 is executed, in which the address A is increased to A=1, and the routine is returned to the step 36, in which the pulse number $n_1$ in the address $A_1$ of the selected block M is set in the first counter 18, followed by the step 38 of setting the pulse period $T_1$ in the address $A_1$ of the selected block K in the timer 22. Subsequently, the steps 40, 42 and 44 are repeated until $n_1$ pulses of the pulse pulse period $T_1$ are issued.

Likewise, pulses are issued from the timer 22 according to the data stored in the following addresses $A_2$ to $A_{15}$ of the selected table blocks M and K. When the issuance of pulses according to the data in the last address $A_{15}$ is completed, the coincidence of the count of the second counter 20 with 16 is detected in the step 48, thus bringing the pulse motor control according to the specified displacement and pulse period tables to a termination.

Figure 8A:
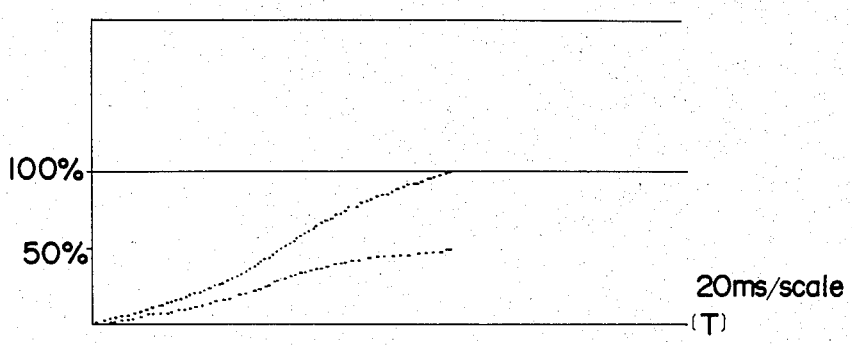
FIGS. 8a, 8b and 8c are record charts showing pulse motor control characteristics obtained according to the present invention.
Figure 8B:
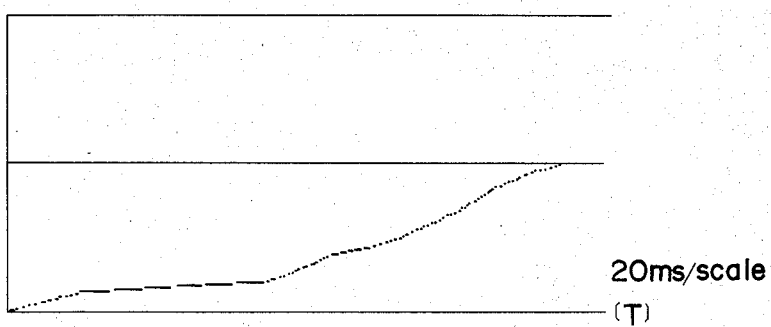
Figure 8C:
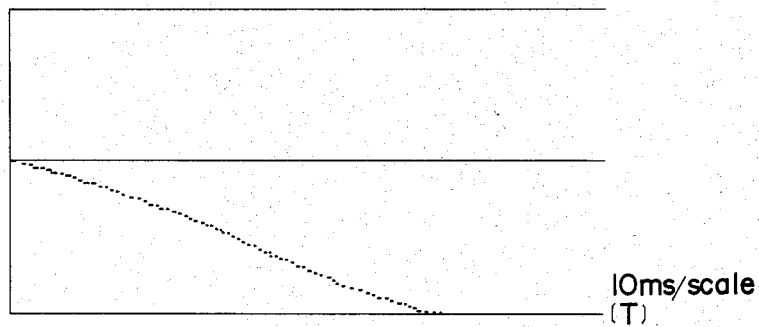

FIGS. 8a, 8b and 8c are graphs showing examples of the pulse motor displacement control patterns obtained with the embodiment described above. The patterns of FIGS. 8a and 8b are obtained when the pulse motor is driven in the forward direction. The pattern of FIG. 8c is obtained when the pulse motor is driven in the reverse direction. As is clear from these patterns, according to the present invention, a desired displacement control pattern can be generated to suit the type of the load to be driven by the pulse motor. In addition, analogous displacement control patterns can easily be obtained from a single pattern by changing the prescribed displacement along. For example, 100% and 50% displacements can be obtained in analogous control patterns as shown in FIG. 8a.

In the embodiment so far described, the number N of divisions of the prescribed displacement and time required therefor was set to N=16. However, it may be appropriately changed. It may be increased when it is desired to increase the precision in control, whereas when the control precision is not so significant, it may be reduced. Further, while in the aforementioned embodiment 255 different displacement data and 31 different pattern data have been made available, these numbers are by no means limitative. Particularly as for the displacement pattern, any desired number of different patterns may be set within the memory capacity.

Furthermore, it is desirable to have some displacement and pulse period table data written in the memories before the apparatus is shipped and to leave empty areas in which a user may write desired table data. In this case, the user may work out and write table data while operating an apparatus that is driven by the pulse motor.

What is claimed is:

1. A pulse motor control apparatus comprising:
    a pulse motor;
    a first memory means for storing a plurality of different pulse number data blocks corresponding in number to the number of pulses required for the maximum displacement of said pulse motor, each of said pulse number data blocks consisting of pulse number data obtained by dividing a given number of pulse motor drive pulses by a number N, said pulse number data being stored in N displacement divisions such that the sum of the pulse numbers stored in the respective displacement divisions is equal to said given number of pulse motor drive pulses;
    a second memory means for storing displacement pattern data consisting of a plurality of different pulse period data blocks, each of said pulse period data blocks consisting of pulse period data stored in N pulse period divisions corresponding to said displacement divisions; and
    a pulse generating means for generating successive pulses supplied to said pulse motor, said successive pulses being generated as pulses which correspond in number to the pulse numbers of said respective displacement divisions in the pulse number data block stored in said first memory means corresponding to a specified number of pulse motor drive pulses and which have pulse periods of the respective pulse period divisions in the pulse period data block stored in said second memory means corresponding to a specified displacement pattern;
    wherein said pulse generating means includes:
    a displacement setter for selecting the displacement of said pulse motor by specifying the block number of any of said pulse number data blocks stored in said first memory means; and
    a pattern setter for selecting the displacement pattern of said pulse motor by specifying the block number of any of said pulse period data blocks stored in said second memory means.

2. A pulse motor control apparatus according to claim 1, wherein said pulse generating means includes:
    a timer means in which pulse period data $T_0$ to $T_{N-1}$ of the respective pulse period divisions $A_0$ to $A_{N-1}$ in the specified pulse period data block stored in said second memory means are preset one after another, said timer means issuing pulses of preset pulse periods;
    a first counter means in which pulse number data $n_0$ to $n_{N-1}$ of the respective displacement divisions $A_0$ to $A_{N-1}$ in the specified pulse number data block stored in said first memory means are preset one after another, said first counter means counting the pulses issued from said timer means and producing an output whenever the count coincides with the preset pulse number; and
    a second counter means for presetting, in response to the count output of said first counter means, the pulse number data and pulse period data of the next displacement and pulse period divisions in said first counter means and said timer means, respectively, said second counter means inhibiting the issuance of pulses when its count coincides with the number N of divisions.

3. A pulse motor control apparatus according to claim 1, wherein the number N of said displacement and pulse period divisions in said first and second memory means is equal to 16.

4. A pulse motor control apparatus comprising:

a pulse motor;

a first memory means for storing a plurality of different pulse number data blocks corresponding in number to the number of pulses required for the maximum displacement of said pulse motor, each of said pulse number data blocks consisting of pulse number data obtained by dividing a given number of pulse motor drive pulses by a number N, said pulse number data being stored in N displacement divisions such that the sum of the pulse numbers stored in the respective displacement divisions is equal to said given number of pulse motor drive pulses;

a second memory means for storing displacement pattern data consisting of a plurality of different pulse period data blocks, each of said pulse period data blocks consisting of pulse period data stored in N pulse period divisions corresponding to said displacement divisions; and a pulse generating means for generating successive pulses supplied to said pulse motor, said successive pulses being generated as pulses which correspond in number to the pulse numbers of said respective displacement divisions in the pulse number data block stored in said first memory means corresponding to a specified number of pulse motor drive pulses and which have pulse periods of the respective pulse period divisions in the pulse period data block stored in said second memory means corresponding to a specified displacement pattern;

wherein said pulse generating means includes:

a timer means in which pulse period data $T_0$ to $T_{N-1}$ of the respective pulse period divisions $A_0$ to $A_{N-1}$ in the specified pulse period data block stored in said second memory means are preset one after another, said timer means issuing pulses of preset pulse periods;

a first counter means in which pulse number data $n_0$ to $n_{N-1}$ of the respective pulse period divisions $A_0$ to $A_{N-1}$ in the specified pulse number data block stored in said first memory means are preset one after another, said first counter means counting the pulses issued from said timer means and producing an output whenever the count coincides with the present pulse number; and a second counter means for presetting, in response to the count output of said first counter means, the pulse number data and pulse period data of the next displacement and pulse period divisions in said first counter means and said timer means, respectively, said second counter means inhibiting the issuance of pulses when its count coincides with the number N of divisions.

5. A pulse motor control apparatus comprising:

a pulse motor;

a first memory means for storing a plurality of different pulse number data blocks corresponding in number to the number of pulses required for the maximum displacement of said pulse motor, each of said pulse number data blocks consisting of pulse number data obtained by dividing a given number of pulse motor drive pulses by a number N, said pulse number data being stored in N displacement divisions such that the sum of the pulse numbers stored in the respective displacement divisions is equal to said given number of pulse motor drive pulses;

a second memory means for storing displacement pattern data consisting of a plurality of different pulse period data blocks, each of said pulse period data blocks consisting of pulse period data stored in N pulse period divisions corresponding to said displacement divisions; and a pulse generating means for generating successive pulses supplied to said pulse motor, said successive pulses being generated as pulses which correspond in number to the pulse numbers of said respective displacement divisions in the pulse number data block stored in said first memory means corresponding to a specified number of pulse motor drive pulses and which have pulse periods of the respective pulse period divisions in the pulse period data block stored in said second memory means corresponding to a specified displacement pattern;

wherein the number N of said displacement and pulse period divisions in said first and second memory means is equal to 16.

* * * * *